United States Patent [19]
Beall et al.

[11] Patent Number: 5,122,484
[45] Date of Patent: Jun. 16, 1992

[54] ZINC PHOSPHATE LOW TEMPERATURE GLASSES

[75] Inventors: George H. Beall, Big Flats; James E. Dickinson, Jr., Corning; Robert M. Morena, Caton, all of N.Y.

[73] Assignee: Corning Incorporated, Corning, N.Y.

[21] Appl. No.: 704,864

[22] Filed: May 23, 1991

[51] Int. Cl.$^5$ ............ C03C 3/21; C03C 3/23
[52] U.S. Cl. ........................ 501/46; 501/15; 501/32; 501/43
[58] Field of Search ............ 501/15, 32, 17, 43, 501/46

[56] References Cited

U.S. PATENT DOCUMENTS

| | | | |
|---|---|---|---|
| 4,476,233 | 10/1984 | Kodama | 501/44 |
| 4,874,724 | 10/1989 | Beall et al. | 501/46 |
| 4,920,081 | 4/1990 | Beall et al. | 501/44 |
| 5,071,795 | 12/1991 | Beall et al. | 501/44 |

Primary Examiner—Mark L. Bell
Attorney, Agent, or Firm—C. S. Janes, Jr.

[57] ABSTRACT

This invention relates to a glass exhibiting a transistion temperature no higher than 425° C. and excellent resistance to attack by water consisting essentially, expressed in terms of weight percent on the oxide basis, of about:

| | | | |
|---|---|---|---|
| $P_2O_5$ | 38-50 | $MoO_3$ | 0-10 |
| $Al_2O_3$ | 0-5 | $WO_3$ | 0-10 |
| $Na_2O$ | 2-10 | $MoO_3 + WO_3$ | 2-15 |
| $Li_2O$ | 0.75-5 | $SnO_2$ | 0-10 |
| $K_2O$ | 2-10 | Cl | 0-8 (analyzed) |
| $Na_2O + Li_2O + K_2O$ | 5-25 | $Sn_2O + MoO_3 + WO_3 + Cl$ | 2-25 |
| ZnO | 28-40 | | | and being essentially free of PbO.

7 Claims, No Drawings

ZINC PHOSPHATE LOW TEMPERATURE GLASSES

BACKGROUND OF THE INVENTION

Glasses in the form of powder (termed frits) have been used for many years as sealants and as coatings on glasses, ceramics, and metals. Frits capable of performing those functions at low temperatures, i.e., temperatures below 500° C., however, are relatively uncommon. Commercially available glasses having that capability have, for the most part, been based upon the PbO-$B_2O_3$ eutectic, the most notable of such glasses being the family of PbO-$B_2O_3$-ZnO frits widely used in television picture tube and other electronic sealing applications. One especially advantageous characteristic exhibited by those frits is their good flow prior to sealing. Nevertheless, those frits possess the disadvantage of containing high levels of PbO (typically 70–80% by weight). Because of its possible injurious impact upon human health and the environment, research has been undertaken to develop glasses free of lead. In addition, the resistance of those frits to attack by boiling water is only moderate, and the high density of the frits ($\sim 6.5 g/cm^3$) can be deemed undesirable for certain applications.

Therefore, the primary objective of the present invention was to devise lead-free glass compositions demonstrating a $T_g$ no higher than about 425° C. which, in the form of frits, would demonstrate flow properties at least comparable to those displayed by the above-described lead-containing frits, viz., good flow at temperatures not exceeding 475° C. and preferably not exceeding 450° C., and which would exhibit resistance to attack by water greater than that exemplified by the above-described lead-containing frits.

A specific objective was to devise such glass compositions which would be operable as sealing frits in television picture tube applications.

SUMMARY OF THE INVENTION

We have found that those objectives can be achieved in glass compositions consisting essentially, expressed in terms of weight percent on the oxide basis, of:

| | | | |
|---|---|---|---|
| $P_2O_5$ | 38–50 | $MoO_3$ | 0–10 |
| $Al_2O_3$ | 0–5 | $WO_3$ | 0–10 |
| $Na_2O$ | 2–10 | $MoO_3 + WO_3$ | 2–15 |
| $Li_2O$ | 0.75–5 | $SnO_2$ | 0–10 |
| $K_2O$ | 2–10 | Cl | 0–8 (analyzed) |
| $Na_2O + Li_2O + K_2O$ | 5–25 | $SnO_2 + MoO_3 + WO_3 + Cl$ | 2–25 |
| ZnO | 28–42 | | |

To assure good chemical durability, the presence of $Al_2O_3$ in an amount of at least 0.75% is preferred. The most preferred glasses consist essentially of:

| | | | |
|---|---|---|---|
| $P_2O_5$ | 40–50 | $MoO_3$ | 0–8 |
| $Al_2O_3$ | 0.75–3 | $WO_3$ | 0–10 |
| $Na_2O$ | 2–7 | $MoO_3 + WO_3$ | 2–10 |
| $Li_2O$ | 1–4 | $SnO_2$ | 0–6 |
| $K_2O$ | 4–8 | Cl | 0–7 (analyzed) |
| $Na_2O + Li_2O + K_2O$ | 9–20 | $SnO_2 + MoO_3 + WO_3 + Cl$ | 4–20 |
| ZnO | 29–40 | | |

PRIOR ART

Glasses exhibiting transition temperatures ($T_g$) below 450° C., coupled with good resistance to attack by water, having compositions within the base alkali metal zinc phosphate system are disclosed in U.S. Pat. No. 4,940,677 (Beall et al.). Those glasses consist essentially, in weight percent, of about:

| | | | |
|---|---|---|---|
| $Li_2O$ | 0–10 | $P_2O_5$ | 30–57 |
| $Na_2O$ | 0–15 | PbO | 0–50 |
| $K_2O$ | 0–20 | SnO | 0–40 |
| $Li_2O + Na_2O + K_2O$ | 5–25 | PbO + SnO | 0–55 |
| ZnO | 18–45 | | |

In the preferred compositions 0.75–6% $Al_2O_3$ and/or 1–6% $B_2O_3$ will be included, the total of those two constituents not exceeding about 6%.

No reference is made to the required presence of $MoO_3$ and/or $WO_3$ or to the optional inclusion of Cl. Furthermore, the patent has no discussion regarding the use of such glasses in the form of frits useful in coating and sealing applications.

Other glasses demonstrating transition temperatures below 450° C. and exhibiting resistance to attack by water superior to that displayed by the glasses of Pat. No. 4,940,677 are described in U.S. Pat. No. 4,996,172 (Beall et al.). These latter glasses likewise have compositions within the basic alkali metal zinc phosphate system, but also contain $Y_2O_3$ and/or a rare earth metal oxide from the lanthanide group ($RE_2O_x$). Thus, the glasses consist essentially, in weight percent, of about:

| | | | |
|---|---|---|---|
| $Li_2O$ | 0–10 | $P_2O_5$ | 30–60 |
| $Na_2O$ | 0–15 | PbO | 0–50 |
| $K_2O$ | 0–20 | SnO | 0–40 |
| $Li_2O + Na_2O + K_2O$ | 5–25 | PbO + SnO | 0–55 |
| ZnO | 6–45 | $Y_2O_3$ and/or $RE_2O$ | 2–10 |

In the preferred glasses up to 4% $Al_2O_3$ will be included.

In like manner to the text of Pat. No. 4,940,677, no mention is made of the mandated presence of $MoO_3$ and/or $WO_3$ or the optional inclusion of Cl.

U.S. application Ser. No. 07/639,100, now U.S. Pat. No. 5,071,795, filed Jan. 9, 1991 by G. H. Beall and C. J. Quinn under the title ALKALI ZINC HALOPHOSPHATE GLASSES, records glasses manifesting transition temperatures no higher than about 350° C. and good resistance to attack by moisture and mild aqueous alkaline solutions. These glasses, in like manner to those described in the previous two patents, have compositions within the base alkali metal zinc phosphate system, but also contain Cl and optionally F. Accordingly, those glasses consist essentially, in weight percent, of about:

| | | | |
|---|---|---|---|
| $Li_2O$ | 0–5 | SnO | 0–10 |
| $Na_2O$ | 2–12 | $Al_2O_3$ | 0–3 |
| $K_2O$ | 0–10 | $P_2O_5$ | 25–37 |
| $Li_2O + Na_2O + K_2O$ | 10–20 | Cl | 0.5–8 |
| ZnO | 20–42 | F | 0–5 |

The sum of $Li_2O + Na_2O + K_2O + ZnO + SnO + Al_2O_3 + P_2O_5$ constitutes at least 90 mole percent of the total oxide composition.

Although Cl is a required component in those glasses, no reference is made to $MoO_3$ and/or $WO_3$, an indispensable factor in the present inventive glass frits.

Whereas the use of $MoO_3$ and $WO_3$ in glass compositions is known to the glass art, e.g., U.S. Pat. No. 3,907,584 (Wada et al.) as a component in a television picture tube faceplate glass composition, U.S. Pat. No. 3,728,139 (Flannery et al.) as a component in a borosilicate opal glass composition, and U.S. Pat. No. 3,985,534 (Flannery et al.) as nucleating agents in the production of glassceramic articles, it is believed that their use in leadfree phosphate-based glass compositions exhibiting transition temperatures below 450° C. is novel, and hence, the above-described disclosures relating to alkali metal zinc phosphate glasses comprise the most relevant prior art.

DESCRIPTION OF PREFERRED EMBODIMENTS

Table I records a group of glass compositions, expressed in terms of parts by weight on the oxide basis as calculated from the batch, illustrating the inventive glasses. Inasmuch as the sum of the individual constituents totals or closely approximates 100, for all practical purposes the value reported for each component may be considered to reflect weight percent. The chloride was incorporated as an alkali metal halide. Nevertheless, out of convenience and because it is not known with which cation the Cl ion is bonded, it is merely reported as chloride. The batch ingredients for the oxide components may comprise any materials, either the oxide itself or other compound, which, when melted together with the other batch ingredients, will be converted into the desired oxide in the proper proportions. For example, $H_3PO_4$ can comprise the source of $P_2O_5$ and $Li_2CO_3$ the source of $Li_2O$.

The batch materials were compounded, ballmilled together to assist in obtaining a homogeneous melt, and thereafter charged into platinum crucibles. Where phosphoric acid comprised the source of $P_2O_5$, the batch was calcined at 400° C. for 16 hours prior to charging into the crucibles. The crucibles were introduced into a furnace operating at about 1000°-1200° C. and maintained therewithin for about 4-6 hours.

The melts were poured from the crucibles between water cooled steel rollers to be quenched into flakes which were then dry ballmilled to powder having a mean particle size between about 10-20 microns. Discs having a diameter of about 0.5″ (~1.27cm) were dry pressed from the powders and those discs fired for two hours at various top temperatures, the heating rate being about 300° C./hour.

TABLE I

|  | 1 | 2 | 3 | 4 | 5 | 6 | 7 |
|---|---|---|---|---|---|---|---|
| $P_2O_5$ | 47.8 | 45.5 | 43.5 | 42.6 | 40.3 | 45.5 | 40.7 |
| $Al_2O_3$ | 2.0 | 1.9 | 1.8 | 1.7 | 1.7 | 1.9 | 1.7 |
| $Na_2O$ | 4.4 | 4.2 | 4.0 | 3.9 | 3.7 | 4.2 | 3.8 |
| $Li_2O$ | 1.8 | 1.7 | 1.6 | 1.6 | 1.5 | 1.7 | 1.5 |
| $K_2O$ | 6.7 | 6.4 | 6.1 | 6.0 | 5.7 | 6.4 | 5.7 |
| ZnO | 37.3 | 35.3 | 33.9 | 33.1 | 31.3 | 35.3 | 31.6 |
| $MoO_3$ | — | 5.0 | — | — | — | — | 4.5 |
| $WO_3$ | — | — | 2.5 | 4.7 | 9.8 | 5.0 | 4.5 |
| Cl | — | — | 6.5 | 6.4 | 6.1 | — | 6.1 |

|  | 8 | 9 | 10 | 11 | 12 | 13 | 14 |
|---|---|---|---|---|---|---|---|
| $P_2O_5$ | 40.6 | 42.4 | 42.7 | 43.1 | 42.6 | 42.4 | 42.9 |

TABLE I-continued

| $Al_2O_3$ | 1.8 | 1.9 | 1.8 | 1.8 | 0.9 | 1.8 | 1.9 |
|---|---|---|---|---|---|---|---|
| $Na_2O$ | 3.7 | 6.0 | 3.4 | 3.6 | 4.6 | 4.0 | 5.8 |
| $Li_2O$ | 1.6 | 1.3 | 1.0 | 1.4 | 1.0 | 1.6 | 1.3 |
| $K_2O$ | 5.8 | 3.7 | 7.0 | 5.5 | 5.9 | 5.6 | 3.4 |
| ZnO | 31.3 | 30.6 | 32.1 | 32.5 | 30.4 | 33.5 | 30.5 |
| $MoO_3$ | — | 4.6 | — | — | 4.5 | — | 30.5 |
| $WO_3$ | 4.5 | 3.9 | 6.3 | 6.4 | 3.8 | 4.7 | 3.8 |
| $SnO_2$ | 4.5 | — | — | — | — | — | — |
| Cl | 6.4 | 5.6 | 5.8 | 5.8 | 6.3 | 6.5 | 5.7 |

Example 1 replicates Example 23 of Pat. No. 4,940,677, a glass demonstrating a $T_g$ below 350° C. and good chemical resistance to a wide range of solvents, including water. When discs thereof were fired at 450° C., no flow thereof was observed, the discs exhibited porosity, and the sides thereof were sharp. The top temperature was raised to 500° C. and then to 600° C. No evidence of flow was observed at either temperature. Each specimen contained porosity and displayed sharp sides; i.e., there was no evidence of any rounding of the edges of the sides.

In investigating the cause for that lack of flow despite the low $T_g$ of the glass, the frit of Example 1 was subjected to differential thermal analysis (DTA). That analysis indicated a $T_g$ of 335° C. and an initial crystallization temperature ($T_{crys}$) for the crystallization exotherm of 390° C.. The latter exotherm was sharp and intense. Based upon that finding, it has been posited that surface crystallization is so pronounced for the finely-divided frit powder that the substantial flow observed in bulk forms of the glass does not occur when in frit form.

Discs of Example 2 were fired for two hours at 450° C., 475° C., and 500° C. The discs fired at 450° C. exhibited rounded edges and those fired at 475° C. and 500° C. displayed good flow through slumping and puddling. DTA analyses of the frit indicated that, relative to Example 1, the $T_g$ was virtually unchanged at 340° C., but the crystallization exotherm was much less intense and the $T_{crys}$ was shifted to a higher temperature, viz., 435° C. That substantial change in $T_{crys}$ has suggested that $MoO_3$ is serving to suppress surface crystallization in the base alkali zinc phosphate glass Adding chloride (conveniently in the form of an alkali metal chloride) at batched levels of up to 15% by weight did not appear to produce any additional flow over that displayed by the $MoO_3$-containing glasses without chloride additions. The loss of chloride during melting of the batch averaged about 50-70%.

A greater improvement in flow was achieved through addition of $WO_3$ to the base glass. Thus, frits containing 2.5% and 5% $WO_3$ exhibited good flow when fired at 450° C. The addition of chloride enhanced the flow of the frits at ° C. to such an extent that puddling occurred. No benefit in flow was observed at $WO_3$ concentrations greater than 10% where, even with additions of chloride, flow was limited to rounding of the side edges of the discs.

Good flow with firings at 450° C. was observed in frits containing chloride for combinations of $MoO_3$ with $WO_3$, and $WO_3$ with $SnO_2$. No improvement in flow was seen with $SnO_2$ additions alone.

Table II records the flow evidenced by the discs pressed from the frit compositions listed in Table I after being fired for two hours at the temperature reported.

TABLE II

| Temp. | 1 | 2 | 3 | 4 | 5 | 6 | 7 |
|---|---|---|---|---|---|---|---|
| 450° | None | Round | Puddled | Puddled | Round | Round | Puddled |
| 475° | None | Slump | Puddled | Puddled | Round | Round | Puddled |
| 500° | None | Slump | — | — | — | — | — |
| 600° | None | — | — | — | — | — | — |

| Temp. | 8 | 9 | 10 | 11 | 12 | 13 | 14 |
|---|---|---|---|---|---|---|---|
| 450° | Slump | Puddled | Puddled | Puddled | Puddled | Puddled | Puddled |
| 475° | Slump | — | — | — | — | — | — |

None = sharp edges on disc
Round = edges rounded on disc
Slump = disc slumped down
Puddled = disc melted to form puddle Although the good flow of the inventive frits at ~450° C. rendered them especially attractive for use as sealing frits for television picture tube applications, the linear coefficients of thermal expansions of the glasses were too high; i.e., over the temperature range of about 25°–300° C. their coefficients ranged about $120-140 \times 10^{-7}/°$ C., rather than the $100-105 \times 10^{-7}/°$ C. displayed by the sealing frits currently used commercially.

Reducing the linear coefficient of thermal expansion to an acceptable level without degrading the desired low temperature flow characteristics has been accomplished via the inclusion of low expansion mill additions to the frits. One especially advantageous mill addition comprises β-quartz solid solution, which crystals demonstrate a linear coefficient of thermal expansion (25°–300° C.) in the vicinity of $0 \times 10^{-7}/°$ C. Table III illustrates the dramatic effect upon the coefficient of thermal expansion which small additions of β-quartz solid solution crystals can have. The source of β-quartz solid solution crystals utilized in the work set out in Table III comprised particles having diameters averaging about 10 microns resulting from ballmilling pieces of glass-ceramic cookware marketed by Corning Incorporated, Corning, NY under the trademark VISIONSR. The glass-ceramic material, the composition of which is encompassed within U.S. Pat. No. 4,018,612 (Chyung), is greater than 90% by volume crystalline, with β-quartz solid solution constituting essentially the sole crystal phase. Table III reports additions of β-quartz solid solution crystals to the frits in terms of weight percent and the linear coefficient of thermal expansion over the range of about 25°–300° C. in terms of $\times 10^{-7}/°$ C.

TABLE III

|  | β-Quartz | Coef. Exp. |
|---|---|---|
| Example 4 | 0 | 138.2 |
| Example 4 | 10 | 95.5 |
| Example 4 | 15 | 81.1 |
| Example 8 | 0 | 133.3 |
| Example 8 | 15 | 71.3 |

Each of the above combinations of frit + additive demonstrated good flow when discs prepared in accordance with the description above were fired for two hours at 450° C. X-ray diffraction analyses of the fired discs identified the presence of β-quartz solid solution crystals, thereby indicating that quartz may be a stable phase in this composition system at the 450° C. firing temperature.

As can be seen, additions of no more than about 5% by weight can be sufficient to lower the expansion coefficient to the desired range of about $100-105 \times 10^{-7}/°$ C. Other mill additions well known to the art for lowering the expansion coefficient of sealing frits, such as cordierite and zircon, can be incorporated into the inventive frits. However, the amount to be added of those materials, viz., about 15–30%, to reduce the expansion coefficient to the desired range, exerts an adverse effect upon the flow of the frit. Accordingly, mill additions operable in the inventive frits will exhibit very low linear coefficients of thermal expansion, such that no more than about 15% by weight need be added. Such materials include β-spodumene solid solution, Invar alloy (64% iron/36% nickel), β-eucryptite solid solution, fused quartz, VYCOR$^R$ brand 96% $SiO_2$ glass, and pyrophosphate crystalline materials having the crystalline structure of magnesium pyrophosphate. The latter materials are described as mill additions exhibiting low coefficients of thermal expansion in U. S. application Ser. No. 07/594,629, filed Oct. 9, 1990 by G. L. Francis. As disclosed therein, the mill addition consisted of magnesium pyrophosphate wherein a portion of the magnesium cations may optionally be replaced by at least one cation selected from the group consisting of aluminum, arsenic, cobalt, iron, zinc, and zirconium.

We claim:

1. A glass exhibiting a transition temperature no higher than 425° C. and excellent resistance to attack by water consisting essentially, expressed in terms of weight percent on the oxide basis, of about:

| | | | |
|---|---|---|---|
| $P_2O_5$ | 38–50 | $MoO_3$ | 0–10 |
| $Al_2O_3$ | 0–5 | $WO_3$ | 0–10 |
| $Na_2O$ | 2–10 | $MoO_3 + WO_3$ | 2–15 |
| $Li_2O$ | 0.75–5 | $SnO_2$ | 0–10 |
| $K_2O$ | 2–10 | Cl | 0–8 (analyzed) |
| $Na_2O + Li_2O + K_2O$ | 5–25 | $Sn_2O + MoO_3 + WO_3 + Cl$ | 2–25 |
| ZnO | 29–42 | | | and being essentially free of PbO.

2. A glass according to claim 1 containing at least 0.75% $Al_1O_3$.

3. A glass according to claim 1 consisting essentially of

| | | | |
|---|---|---|---|
| $P_2O_5$ | 40–50 | $MoO_3$ | 0–8 |
| $Al_2O_3$ | 0.75–3 | $WO_3$ | 0–10 |
| $Na_2O$ | 2–7 | $MoO_3 + WO_3$ | 2–10 |
| $Li_2O$ | 1–4 | $SnO_2$ | 0–6 |
| $K_2O$ | 4–8 | Cl | 0–7 (analyzed) |
| $Na_2O + Li_2O + K_2O$ | 9–15 | $Sn_2O + MoO_3 + WO_3 + Cl$ | 4–20 |
| ZnO | 30–40. | | |

4. A glass according to claim 1 which, in the form of frit, exhibits good flow at temperatures not exceeding about 475° C.

5. A glass according to claim 1 also containing up to 15% by weight of a mill addition to lower the linear coefficient of thermal expansion thereof.

6. A glass according to claim 5 wherein said mill addition is selected from the group consisting of β-quartz solid solution, β-spodumene solid solution, 64% iron/36% nickel alloy, β-eucryptite solid solution, fused quartz, 96% $SiO_2$ glass, and pyrophosphate crystalline materials having the crystalline structure of magnesium pyrophosphate.

7. A glass according to claim 6 wherein said pyrophosphate crystalline materials consist of magnesium pyrophosphate wherein a portion of the magnesium cations may optionally be replaced by at least one cation selected from the group consisting of aluminum, arsenic, cobalt, iron, zinc, and zirconium.

* * * * *